US009519468B2

(12) United States Patent
Goetz et al.

(10) Patent No.: US 9,519,468 B2
(45) Date of Patent: Dec. 13, 2016

(54) MODULAR CO-VERSIONING IN A DYNAMICALLY LINKED RUNTIME ENVIRONMENT

(71) Applicant: Oracle International Corporation, Redwood City, CA (US)

(72) Inventors: Brian Goetz, Williston, VT (US); Paul D. Sandoz, Dublin (IE)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 14/622,639

(22) Filed: Feb. 13, 2015

(65) Prior Publication Data

US 2016/0239279 A1    Aug. 18, 2016

(51) Int. Cl.
G06F 9/45     (2006.01)
G06F 9/445    (2006.01)
G06F 9/44     (2006.01)

(52) U.S. Cl.
CPC .. *G06F 8/54* (2013.01); *G06F 8/71* (2013.01)

(58) Field of Classification Search
None
See application file for complete search history.

(56) References Cited

U.S. PATENT DOCUMENTS

| | | | |
|---|---|---|---|
| 4,558,413 A | 12/1985 | Schmidt et al. | |
| 5,915,112 A | 6/1999 | Boutcher | |
| 6,074,432 A * | 6/2000 | Guccione | G06F 9/443 703/27 |
| 6,185,734 B1 | 2/2001 | Saboff et al. | |
| 6,209,128 B1 | 3/2001 | Gerard et al. | |
| 6,442,753 B1 * | 8/2002 | Gerard | G06F 8/71 717/166 |
| 6,519,767 B1 * | 2/2003 | Carter | G06F 9/443 712/E9.084 |
| 6,826,750 B1 | 11/2004 | Curtis et al. | |
| 6,981,250 B1 * | 12/2005 | Wiltamuth | G06F 8/71 707/999.202 |

(Continued)

OTHER PUBLICATIONS

International Search Report and Written Opinion from PCT/US2016/017424, Date of mailing Apr. 18, 2016, Oracle International Corporation, pp. 1-14.

*Primary Examiner* — Isaac T Tecklu
(74) *Attorney, Agent, or Firm* — Robert C. Kowert; Meyertons, Hood, Kivlin, Kowert & Goetzel, P.C.

(57) ABSTRACT

Modular co-versioning may involve the creation of multi-version libraries that may include multiple versions of a class. A multi-version library may include a base version and one or more other versions each of which may correspond to a particular, respective version of a software development kit, runtime environment or software platform, according to various embodiments. At runtime, a multi-version library may be searched in order to load a version of a class that corresponds to the version of the currently executing runtime environment. If the multi-version library does not include a version of the class corresponding to the currently executing version of the environment/platform, a version of the class corresponding to a previous version of the environment may be loaded if found in the multi-version library. Alternatively, if no other version of the class is found, a base version of the class may be loaded from the multi-version library.

20 Claims, 8 Drawing Sheets (56) References Cited

U.S. PATENT DOCUMENTS

| | | | |
|---|---|---|---|
| 7,065,754 B1 | 6/2006 | Coutant et al. | |
| 7,243,346 B1* | 7/2007 | Seth | G06F 9/445 717/162 |
| 7,305,672 B2* | 12/2007 | Vincent | G06F 8/67 717/169 |
| 7,389,515 B1* | 6/2008 | Seth | G06F 9/44594 719/310 |
| 7,536,683 B2* | 5/2009 | Zimmerman | G06F 9/44521 717/162 |
| 8,271,938 B2 | 9/2012 | Dussud et al. | |
| 8,856,734 B2* | 10/2014 | Thyagarajan | 717/107 |
| 9,213,559 B2* | 12/2015 | Sun | G06F 9/44521 717/169 |
| 2003/0159135 A1* | 8/2003 | Hiller | G06F 9/44536 717/166 |
| 2003/0191870 A1* | 10/2003 | Duggan | G06F 8/67 719/331 |
| 2005/0081184 A1* | 4/2005 | Deedwaniya | G06F 9/44521 717/100 |
| 2005/0086633 A1 | 4/2005 | Nachmanson et al. | |
| 2006/0036656 A1 | 2/2006 | Mercer | |
| 2006/0080676 A1 | 4/2006 | Colgrave | |
| 2007/0180442 A1* | 8/2007 | Oi | G06F 9/445 717/166 |
| 2007/0226685 A1* | 9/2007 | Kaakani | G06F 8/67 717/108 |
| 2007/0256069 A1* | 11/2007 | Blackman | G06F 8/433 717/170 |
| 2008/0059940 A1* | 3/2008 | Matic | G06F 8/00 717/100 |
| 2008/0301710 A1* | 12/2008 | Shetty | G06F 9/445 719/316 |
| 2009/0106747 A1* | 4/2009 | Arcese | G06F 9/445 717/166 |
| 2009/0210866 A1* | 8/2009 | Troan | G06F 9/44536 717/168 |
| 2010/0199259 A1* | 8/2010 | Quinn | G06F 9/44536 717/106 |
| 2011/0184990 A1* | 7/2011 | Murphy | G06F 8/20 707/791 |
| 2013/0061205 A1* | 3/2013 | Bohm | G06F 8/36 717/108 |
| 2013/0332943 A1* | 12/2013 | Sun | G06F 9/44521 719/331 |
| 2015/0135170 A1* | 5/2015 | Murray | G06F 9/44536 717/148 |

* cited by examiner

MODULAR CO-VERSIONING IN A DYNAMICALLY LINKED RUNTIME ENVIRONMENT

BACKGROUND

Third party libraries and frameworks typically have to support a range of software platform versions, generally going several versions back. This frequently means that the developers often do not take advantage of features available in newer versions of the software platforms because it is often difficult to express conditional platform dependencies (i.e., reflectively test for and invoke methods that might not be present in all supported platform versions). Alternatively, it may be expensive (e.g., in development time and distribution media) to distribute multiple library versions in order to support different underlying platform versions. This may create disincentives for library and framework developers use new features, which in turn may be a disincentive for users to upgrade to new platform versions, itself creating a disincentive for developers to support features of newer platform versions—a circle that may impedes adoption of new features and improvements.

Software platforms are generally versioned in a backward compatible manner, such that older applications may be able run on newer platform versions. However, software libraries frequently have a dependency on a certain version of an underlying platform. Thus, library developers may desire to have libraries run on older platform versions, yet may also desire to use features from newer platform versions. Thus, software libraries developers frequently delay using newer platform features until they can require the newer platform version (and therefore may not be backward compatible with older platform versions). Alternatively, developers of software libraries may distribute multiples version of a library in order to be both backward compatible for some users and support newer platform features for others.

SUMMARY

Described herein are various embodiments of systems and methods for modular co-versioning in a dynamically linked (e.g., a runtime linkable) runtime environment. According to modular co-versioning, as described herein, multi-version libraries may be created that include multiple versions of a class. A multi-version library may include a base version and one or more other versions each of which may correspond to a particular, respective version of a software development kit, runtime environment or software platform, according to various embodiments. Thus, a multi-version library, as described herein, may be a version of a library in one distribution unit that can take advantage of multiple versions of an underlying runtime, according to some embodiments.

At runtime, a multi-version library may be searched in order to load a version of a class that corresponds to the version of the currently executing runtime environment/platform or to the version of a software development kit used to develop the currently executing environment/platform. If the multi-version library does not include a version of the class corresponding to the currently executing version of the environment/platform, a version of the class corresponding to a previous version of the environment/platform (and/or software development kit) may be found in the multi-version library and loaded. Alternatively, if no later version of the class is found in the multi-version library, a base version of the class may be loaded from the multi-version library.

Thus, modular co-versioning, as described herein may allow library developers to provide multiple versions of classes in order to support multiple versions of a runtime environment, software platform, or software development kit without having to maintain multiple, different libraries and/or deliverables.

DETAILED DESCRIPTION OF EMBODIMENTS

Described herein are various embodiments of systems and methods for implementing modular co-versioning. For example, libraries frequently have a dependency on a certain version of an underlying platform, such as by requiring a particular (or newer) version of a software platform or runtime environment. Library developers may desire to have libraries that run on older platform versions, but may also desire to use features from newer platform versions. Modular co-versioning, as described herein may provide a development and/or software packaging approach for dynamically linked platforms (e.g., runtime linkable) to allow the creation and distribution of multi-version libraries.

Modular co-versioning, as described herein may be considered to break the coupling between the ability to use features from a newer platform version and the loss of backward compatibility by requiring all users to upgrade to a newer version. Library and framework developers may maintain and distribute a single multi-version artifact (e.g., a software library) that can take advantage of new features (or work around the absence of removed features) when executed on newer underlying platforms, while not requiring all users to upgrade (which might reduce the potential users, and therefore the market, of their library).

In some embodiment, modular co-versioning includes the creation of a multi-version library. For example, in a Java-based system, modular co-versioning may utilize a multi-version Java Archive (JAR) format developed using the Java Development kit (JDK), in which a JAR file may appear as a normal (e.g., single version) JAR file to an older runtime environment (e.g., an older JRE), but may also include additional "opaque" folders (e.g., in the META-INF/module directory) which an older runtime environment may ignore.

Figure 1:
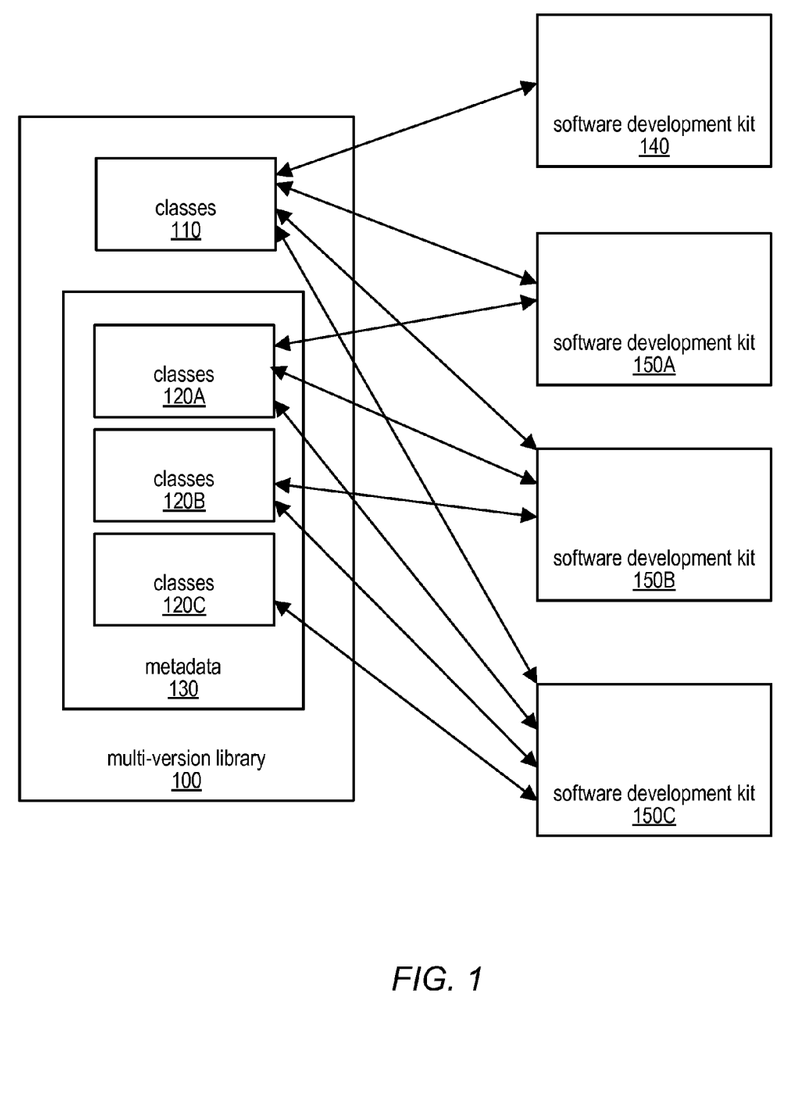
FIG. 1 is a logical block diagram illustrating a multi-version library implemented using modular co-versioning as described herein, according to one embodiment.

However, a runtime environment, or software development tool, configured to support modular co-versioning may utilize the extra information in the multi-version JAR file to support modular co-versioning. FIG. 1 is a logical block diagram illustrating a multi-version library implemented using modular co-versioning as described herein, according to one embodiment.

As shown in FIG. 1, a multi-version library 100 may include multiple versions of classes. For example, classes 110 may represent general, base or root versions of classes (e.g., versions of classes that may be used by multiple supported version of a software development kit and/or runtime environment). Additionally, classes 120A, 120B and 120C may represent different versions of classes (e.g., some or all of the same classes represented by classes 110) that are support by respective versions of the software development kit and/or runtime environment. In some embodiments, multi-version library 100 may include metadata 130 that indicates, and describes, the presence of multiple versions of classes implemented according to modular co-versioning, as will be described in more detail below.

For instance, in one Java-based example, a multi-version JAR may include extra directories with classes, as shown below:
JAR file
    content root—classes for JDK 7 and earlier
    META-INF
        8
            classes that require JDK>=8
        9
            classes that require JDK>=9
        10
            classes that require JDK>=10

As shown above, an example JAR file may include multiple versions of the same classes for different versions of the runtime environment, as supported by particular versions of the software development kit, such as the Java Development Kit (JDK). For example, as shown in FIG. 1, multi-version library 100 may represent a Java-based, multi-version, JAR file that may include base versions of classes, such as classes 110, in the content root section, while including other versions of classes in the JDK 8, JDK 9 and JDK 10 sections, represented by classes 120A, 120B and 120C respectively, according to one example embodiment. In some embodiments, all the versions of a particular class may have the same class signature. In other words, all the versions of the particular class may be considered binary compatible and may correspond to an identical class signature. Therefore, it may be incorrect (or impossible) in some systems to load two different versions of the same class.

In general, a class may be considered a user-defined type or data structure that may include data, variables, functions, methods and/or other attributes as members and that represents a definition, blueprint, or template, for creating programming objects of a specific type. A class may provide initial values for data members and implementations for member functions and methods. Classes are frequently included in libraries. A library may be considered a collection of resources used by software programs or applications. A library may include any of various types of resources including, but not limited to, data, documentation, classes, subroutines, and/or type specifications, according to some embodiments. A library may be organized so as to be utilized by more than one application (possibly at the same time), and may promote re-usability by providing resources so that applications may not have to implement (or re-implement) the same behavior.

When running on different runtime environments (e.g., runtime environments corresponding to different versions of a software development kit) different versions of the classes may be loaded from multi-version library 100 (e.g., the multi-version JAR in the example above). For example, as shown in FIG. 1, classes 110 may correspond to (and support features) software development kit 140 (e.g., a particular version of a software development kit), while classes 120A, 120B and 120C may correspond to (and support features of) software development kits 150A, 150B and 150C respectively (e.g., respective versions of the software development kit).

It should be noted that while described herein mainly in terms of Java-based systems, module co-versioning may also be applied and/or utilized with software development (and execution) systems that are not (or not exclusively) Java-based, according to different embodiments. Additionally, in some embodiments, multi-version library 100 may represent a runtime linkable library, such as a JAR or dynamically linked library (DLL).

At runtime, the runtime environment (or a class loader module of the runtime environment) may load a class from multi-version library 100 (e.g., the multi-version JAR) file by first determining whether multi-version library 100 includes a version of the class corresponding to the version of the runtime environment (e.g., the version that is executing). If multi-version library 100 does include that version, the runtime environment may load that particular version of the class (e.g., a class loader of the runtime environment may load the class). In the above Java-based example, a runtime environment based on JDK version 10 may load one version of the class (e.g., from classes 120B) while a runtime environment based on JDK version 9 may load a different version of the class (e.g., from classes 120C).

Figure 2:
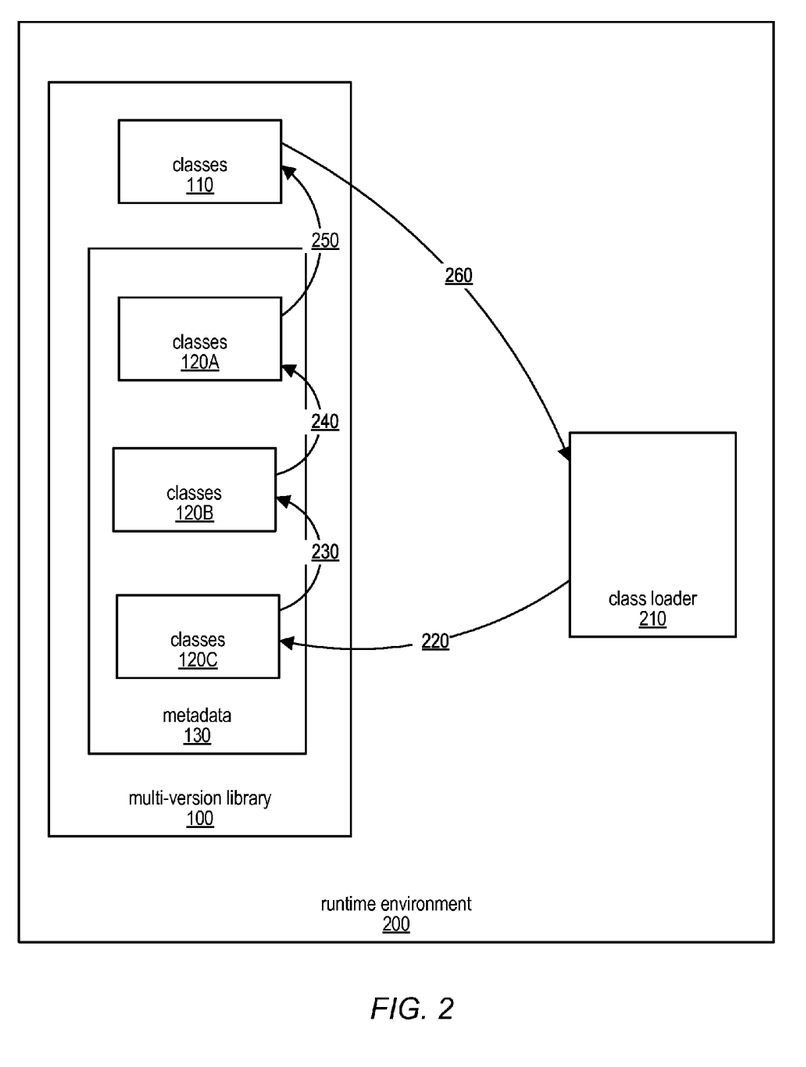
FIG. 2 is a logical block diagram illustrating a class loader configured to load classes from a multi-version library according to modular co-versioning, as in one embodiment.

Thus, a multi-version library (e.g., a multi-version JAR) may be considered to include what amounts to a classpath. FIG. 2 is a logical block diagram illustrating a class loader configured to load classes from a multi-version library according to modular co-versioning, as in one embodiment. For instance, in one embodiment, class loader 210, executing within runtime environment 200 may be configured to load classes by first searching for a class in classes 120C of multi-version library 100, as shown by arrow 220. If an appropriate version of the class is not found within classes 120C, class loader 210 may be configured to then search for a version of the class within classes 120B, as indicated by arrow 230. Similarly, if an appropriate version of the class is not found in classes 120B, class loader 210 may be configured to then search for the class in classes 120A, as indicated by arrow 240. If, classes loader 210 cannot find an appropriate version of the class in any of the version specific areas of multi-version library 100 (e.g., classes 120A, 120B and 120C), class loader 210 may be configured to load a base version of the class from classes 110, as indicated by arrows 250 and 260.

In a Java-based example, at runtime a class loader configured to implement modular co-versioning and executing on JDK version 10, such as class loader 210, may search what amounts to a classpath including the version 10 specific classes (e.g., classes 120C), then the version 9 specific classes (e.g., classes 120B), then the version 8 specific classes (e.g., classes 120A), then the classes in the content root (e.g., classes 110). Similarly, a class loader executing on version JDK 9 may first search the version 9 specific classes (e.g., classes 120B), then the version 8 specific classes (e.g., classes 120A) and then the content root classes (e.g., classes 110), without searching the version 10 specific classes (e.g., since version 10 is later than the currently executing version 9 in this example). Furthermore, a class loader not configured to utilize modular co-versioning may only see (and therefore only load classes from) the content root classes (e.g., classes 110), according to some embodiments. Thus, if JDK versions 8, 9 and 10 all support modular co-versioning while JDK version 7 does not, a single multi-version library may support JDK versions 7 through 10 (e.g., a version 7 class loader may read the base versions of classes while class loaders for versions 8 through 10 may each utilize their respective version-specific classes), as one example.

Figure 3:
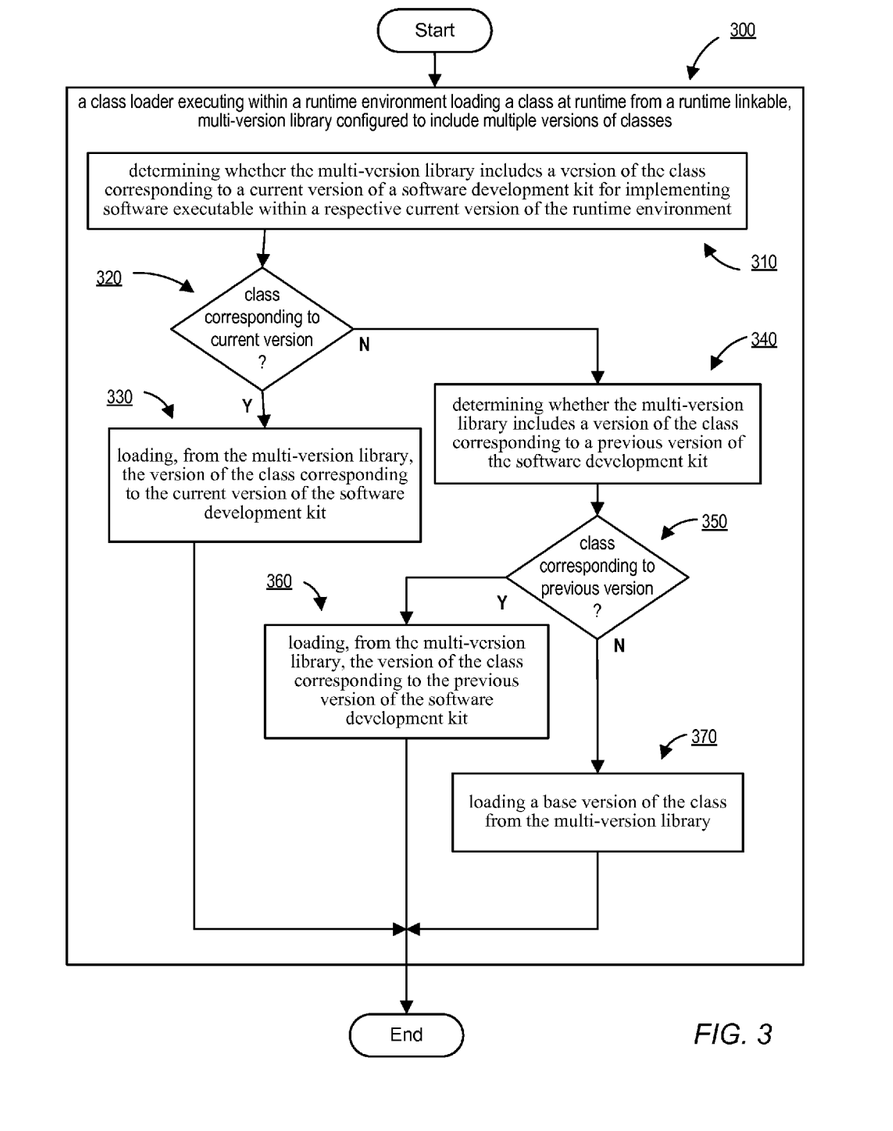
FIG. 3 is a flowchart illustrating one embodiment of a method for loading a class from a multi-version library according to modular co-versioning, as described herein.

FIG. 3 is a flowchart illustrating one embodiment of a method for loading a class from a multi-version library according to modular co-versioning, as described herein. As shown in FIG. 3, a class loader executing within a runtime environment (such as classes loader 210 executing within runtime environment 200), may load a class at runtime from a runtime linkable, multi-version library configured to include multiple versions of classes according to modular co-versioning, (such as multi-version library 100), as shown in block 300. As described above and shown in block 310, the class loader may determine whether the multi-version library includes a version of the class corresponding to a current version of a software development kit for implementing software executable within a respective current version of the runtime environment. For instance, class loader 210 may be determine whether multi-version library 100 includes a version of a class corresponding to a version of the software development kit used to develop software for the same version of runtime environment 200 on which class loader 210 is currently executing, according to one embodiment. In some embodiments, class loader 210 may not search for a version of the desired class (e.g., the class to be loaded) corresponding to the "latest" version of the software development kit because class loader 210 may not have been developed under or executing within a runtime environment corresponding to the "latest" version. Instead, class load 210 may begin searching for the class in an area of multi-version library 100 that includes classes corresponding to the same version of the software development kit as class loader 210 is currently executing (or was development with), according to some embodiments.

In response to determining that the multi-version library does include a version of the class associated with the current version of the software development kit, as indicated by the positive output of decision block 320, the class loader may load the version of the class associated with the current version of the software development kit from the multi-version library, as shown in block 330. For example, as noted above, if class loader 210 finds an appropriate version of a class in classes 120C, class loader 210 may then load that version of the class from multi-version library 100.

However, in response to determining that the multi-version library does not include a version of the class associated with the current version of the software development kit, as indicated by the negative output of decision block 320, the class loader may determine whether the multi-version library includes a version of the class corresponding to a previous version of the software development kit, as shown in block 340. For instance, class loader 210 may be configured to search for a version of the class in classes 120B in response to determining that multi-version library 100 does not include a version of the class in classes 120C. In one Java-based example, a class loader corresponding to JDK 9 may, in response to determining that a multi-version JAR does not include a JDK 9 version of a particular class may determine whether the multi-version JAR includes a JDK 8 version of that class, according to one embodiment.

In response to determining that the multi-version library does include a version of the class corresponding to the previous version of the software development kit, as indicated by the positive output of decision block 350, the class loader may load the version of the class corresponding to the previous version of the software development kit from the multi-version library, as shown in block 360. For instance, class loader 210 may be configured to load a class from classes 120A in response to determining that multi-version library 100 includes a version of the desired class in classes 120A, according to one embodiment. In a Java-based example, a class loader corresponding to JDK 9 may load a JDK 8 version of a class in response to determining that a multi-version JAR does not include a JDK 9 version of a particular class and in response to determining that the multi-version JAR does include a JDK 8 version of the class.

Similarly, in response to determining that the multi-version library does not include a version of the class corresponding to the previous version of the software development kit, as indicated by the negative output of decision block 350, the class loader may be configured to load a base version of the class from the multi-version library as indicated by block 370. For instance, class loader 210 may be configured to load a class from classes 110 in response to determining that multi-version library 100 does not include a version of the desired class in any of classes 120C, 120B or 120A, according to one embodiment. In a Java-based example, a class loader corresponding to JDK 9 may load a base version of a class in response to determining that a multi-version JAR does not include a version of a particular class corresponding to JDK version 8, 9 or 10.

Thus, modular co-versioning may, in some embodiment, allow library developers to create and distribute a single library that can be both backwards compatible with older runtime environment versions and that also supports later features provided in newer versions of the runtime environment. Users executing older versions of the runtime environment may use the same library as users executing newer versions of the runtime environment. The library developer therefore may not have to distribute multiple versions, thus potentially preventing confusion for the users (e.g., a user can't accidentally download and install the wrong version of the library). Furthermore, the library developer may not have to require all users to upgrade to the newer version of the runtime environment.

Additionally, a multi-version library may not include multiple versions of every class. Instead, a multi-version library may include multiple versions of some classes, but not of others. Additionally, a multi-version library may include the same number of versions for every class. For example, a multi-version library may include fewer versions of one class than of another class, according to some embodiments.

Modular co-versioning may be implemented in different manners and for different systems, according to various embodiments. For example, a Java-based example of modular co-versioning may include a multi-version JAR file (e.g., multi-version library 100) that may include a content root folder (or area, or section) including base versions of classes and/or resources, as well as a META-INF folder (or area, or section) including metadata about the JAR include information regarding additional versions of the classes and/or resources. For instance, multi-version library 100 may include classes 110 representing a content root folder as well as metadata 130 representing a META-INF folder, according one embodiment. In other embodiments, multi-version library 100 may be implemented using a software programming language other than Java (e.g., such as C, C++, etc.).

By including versioning metadata regarding specific groups of files, a multi-version library supporting modular co-versioning may encode (e.g., include) multiple versions of a library for different underlying platform versions compatibly (e.g., compatible with multiple versions of a software development kit).

Figure 4:
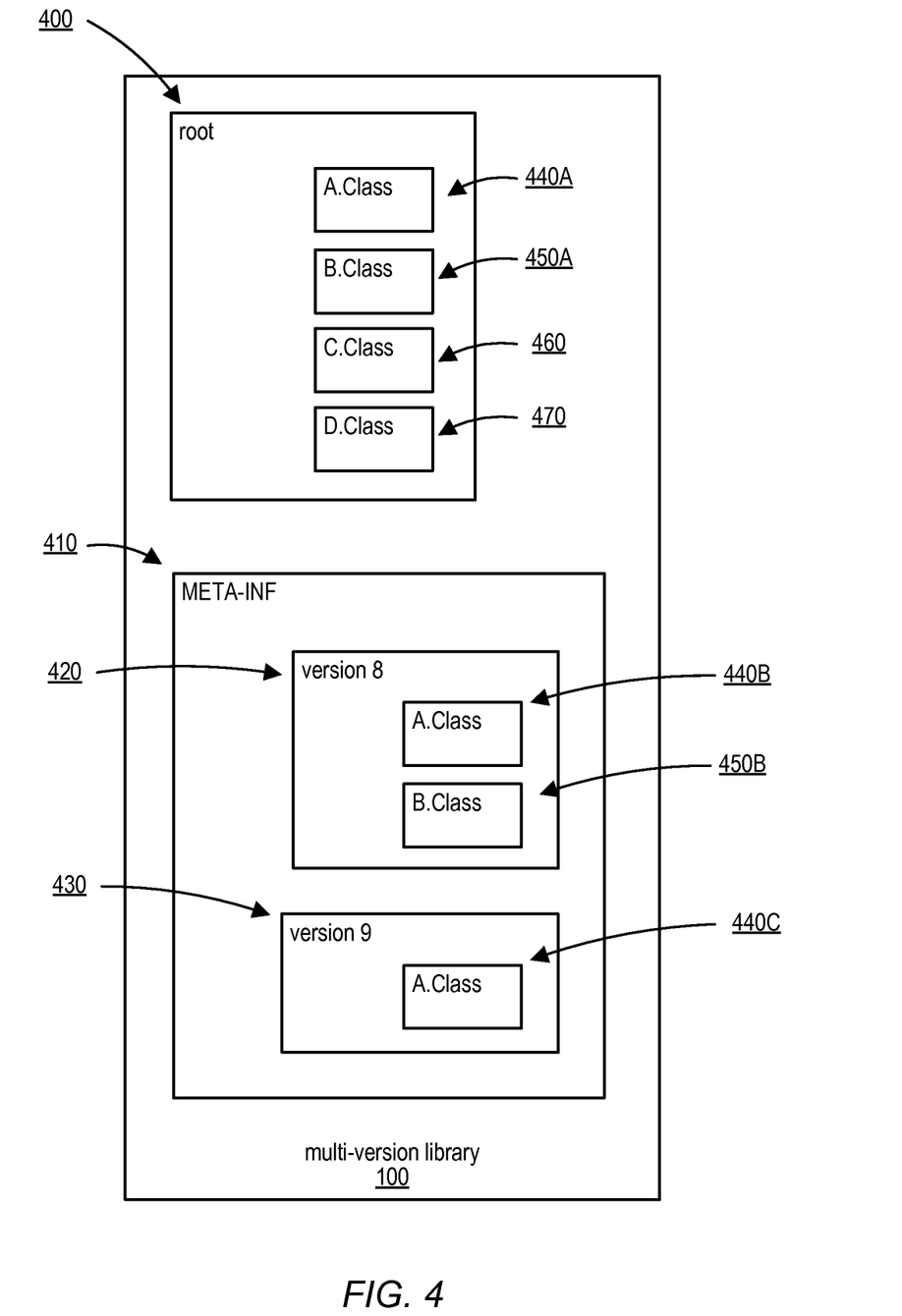
FIG. 4 is a logical block diagram illustrating a Java-based multi-version library implemented according to modular co-versioning, as in one embodiment.

As described above, a multi-version library may include additional folders for code (e.g., classes and/or resources) specific to particular versions of a software development kit (and/or runtime environment). For instance, in one Java-based example, a multi-version JAR (MVJAR) may include additional folders for code specific to particular Java Development Kit (JDK) versions. Thus, one example JAR for a typical library might look like (e.g., without supporting multiple versions):

jar root
    A.class
    B.class
    C.class
    D.class Additionally, if there were alternate versions of classes A and B (e.g., that take advantage of version 8 features, and yet another version of class A that takes advantage of 9 features, they could be included in a multi-version JAR, according to one example embodiment, as shown below:

jar root
    A.class
    B.class
    C.class
    D.class
    META-INF
        versions
            8
                A.class
                B.class
            9
                A.class FIG. 4 is a logical block diagram illustrating a Java-based example of a multi-version library implemented using modular co-versioning according to the example above, as in one embodiment. As shown in FIG. 4, multi-version library 100, which may in one embodiment represent a Java-based multi-version JAR, may include a root area or folder 400 including base versions of classes, as well as a META-INF area or folder 410 including information regarding additional versions of classes. For example, root folder 400 may include base versions of classes A, B, C and D, illustrated by blocks 440A, 450A, 460 and 470. Additionally, META-INF folder 410 may include, for example, two folders 420 and 430 including classes specific to versions 8 and 9 of the JDK, respectively, as illustrated by block 440B, 450B and 440C. Thus, in FIG. 4, blocks 440A, 440B and 440C may represent three different versions of class A and blocks 450A and 450B may represent two different versions of class B, according to the Java-based example above.

The classes in the root folder 400 may be the only ones visible (or available) to a traditional runtime environment not configured to support modular co-versioning—thereby possibly making the multi-version library 100 indistinguishable from a traditional library to the traditional runtime environment—with the exception of the META-INF folder 410 that may ignored by the traditional runtime environment, according to some embodiments.

Additionally, in some embodiments, to a runtime environment that does support modular co-versioning classes corresponding to software development kit versions higher than the currently executing one may be ignored. For instance, using the Java-based example above, at runtime, folder 430 may be ignored by a runtime environment (e.g., a class loader executing within the runtime environment) corresponding to JDK version 8. Thus, a version 8 based class loader may search for classes in folder 420 (e.g., corresponding to the currently executing version). If no appropriate class is found, the class loader may then search the for same class in folders corresponding to previous (e.g., lower) versions of the JDK if any exist in the multi-version JAR, and may then search the JAR content root folder if no appropriate version of the class is found in any of the version-specific areas, according to some embodiments.

In other words, a class loader corresponding to a version 9 JDK, the runtime environment may search for classes in a multi-version JAR file as if there were a JAR-specific classpath containing first the version 9 files, then the version 8 files, and then the JAR root, according to some embodiments. However, on a version 8 JDK, this classpath may contain only the version 8 files and the JAR root (e.g., it may ignore the version 9 classes since they correspond to a version later than the currently executing one).

By utilizing modular co-versioning, it may be possible for versions of a class designed for a later software development kit version to "override" the version of that same class designed for an earlier version. In the Java-based example above, when running on a version 8 JDK configured to support modular co-versioning, the JDK 8 specific versions of classes A and B (e.g., blocks 440B and 450B), as well as the general (e.g., base or content root) versions of classes C and D (e.g., blocks 460 and 470) may be visible (and/or available). However, when running a version 9 JDK configured to support modular co-versioning, the JDK 9 specific version of class A (e.g., block 440C), the JDK 8-specific version of class B (e.g., block 450B) and the general versions of classes C and D (e.g., blocks 460 and 470) may be visible. When running an older version of the JDK or on a JDK not configured to support modular co-versioning, only the base versions of all classes (e.g. blocks 440A, 450A, 460 and 470) may be visible.

While described herein mainly in terms of classes and class files, in some embodiments, resource files may be treated the same way as class files when implementing modular co-versioning. In other words, according to some embodiment, multiple versions of a resource may be included in a single file and different versions may be utilized with different versions of a software development kit or runtime environment. Additionally, classes and/or resources described herein as not being visible may be visible, in some embodiments, to a class loader or runtime environment, but the class loader or runtime environment may be configured to ignore or otherwise not utilize those classes and/or resources.

Additionally, when implementing modular co-versioning, traditional version control (e.g., as part of a software development tool) may be modified in order to correctly handle multiple versions of classes and or resources. For example, in a Java based system version control may not be applicable to the metadata in multi-version JAR files (e.g., such as the declaring of the main application class and services), according to one embodiment.

In some embodiments, a multi-version library, such as a Java-based multi-version JAR, may be considered a single unit of release that has its own version, even though it may internally represent multiple versions of a library implementation for use on different platform (e.g., runtime environment) versions. Therefore, each version of the multi-version library implementation may be identical with respect to public APIs, such as to ensure strict API compatibility. In some embodiments, this may mean that a public class present in a version specific folder should have a corresponding version in the root folder. However, a class may not necessarily have to have a version in every version specific folder.

Figure 5:
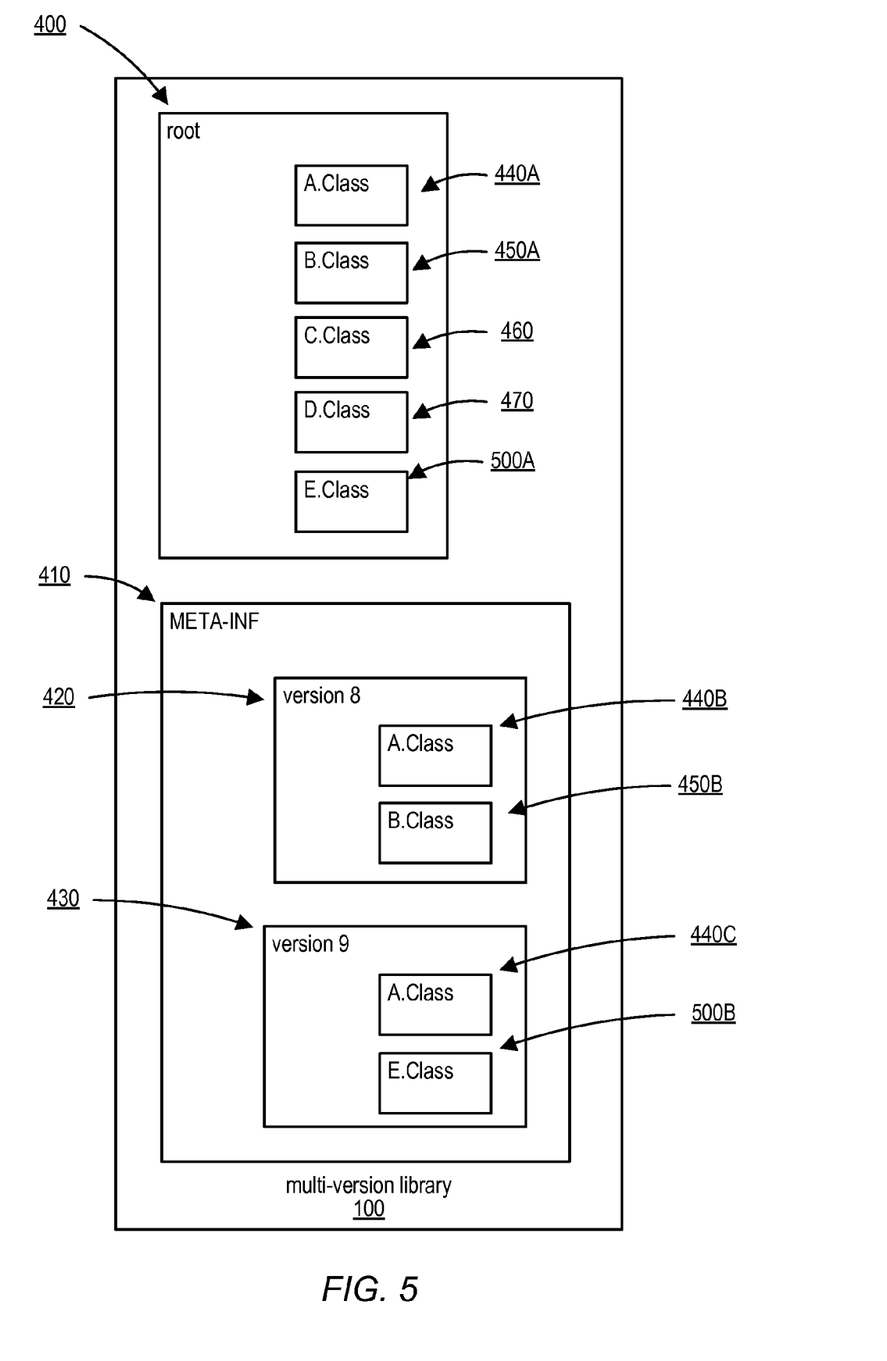
FIG. 5 is a logical diagram illustrating one embodiment of a multi-version library according to modular co-versioning that does not include a version of every class in every folder, as described herein.

For example, FIG. 5 is a logical diagram illustrating one embodiment of a multi-version library according to modular co-versioning that does not include a version of every class in every folder, as described herein. The multi-version library illustrated in FIG. 5 is very similar to that illustrated in FIG. 4 discussed above. However, FIG. 5 illustrates versions of an additional class E, represented by blocks 500 and 500A, according to one embodiment. Thus, in a Java based example, multi-version library 100 may include a base version of a class E (e.g., block 500A) in the JAR root folder 400 as well as a version 9 version of class E (e.g., block 500B) in the version 9 folder 430 without including a version 8 version of class E in the version 8 folder 420. When loading class E, a class loader corresponding to a version 9 JDK may be configured to find and load the version of the class (e.g., block 500B) in the version 9 folder 430, while a class loader corresponding to a version 8 JDK may be configured to ignore the version of the class in the version 9 folder 430 and to load the base version of the class (e.g., block 500A) since there is no version of the class E the version 8 folder 420, according to one example embodiment.

According to some embodiments, modular co-versioning may enable library and framework developers to decouple the use of features from a specific software development kit (and/or runtime environment/platform) version from the requirement that all their users to migrate to that specific version. Instead, library and framework maintainers may gradually migrate to (and/or) support new features, while still providing support for the old features, using a single deliverable library (e.g., a multi-version library).

Implementing modular co-versioning may involve one or more development and/or runtime components. For instance, software development tools, such as compilers, linkers and other library tools, may be configured to be able to create multi-version libraries. For example in a Java-based example embodiment, the following components may be configured to implement some part (or all) of modular co-versioning, as described herein:
 the JAR specification.
 the class loader implementation
 the JAR creation tool and the JAR signer tool
 the compiler,
 one or more testing tools,
 component scanning libraries,
 as well as debugging tools.

Figure 6:
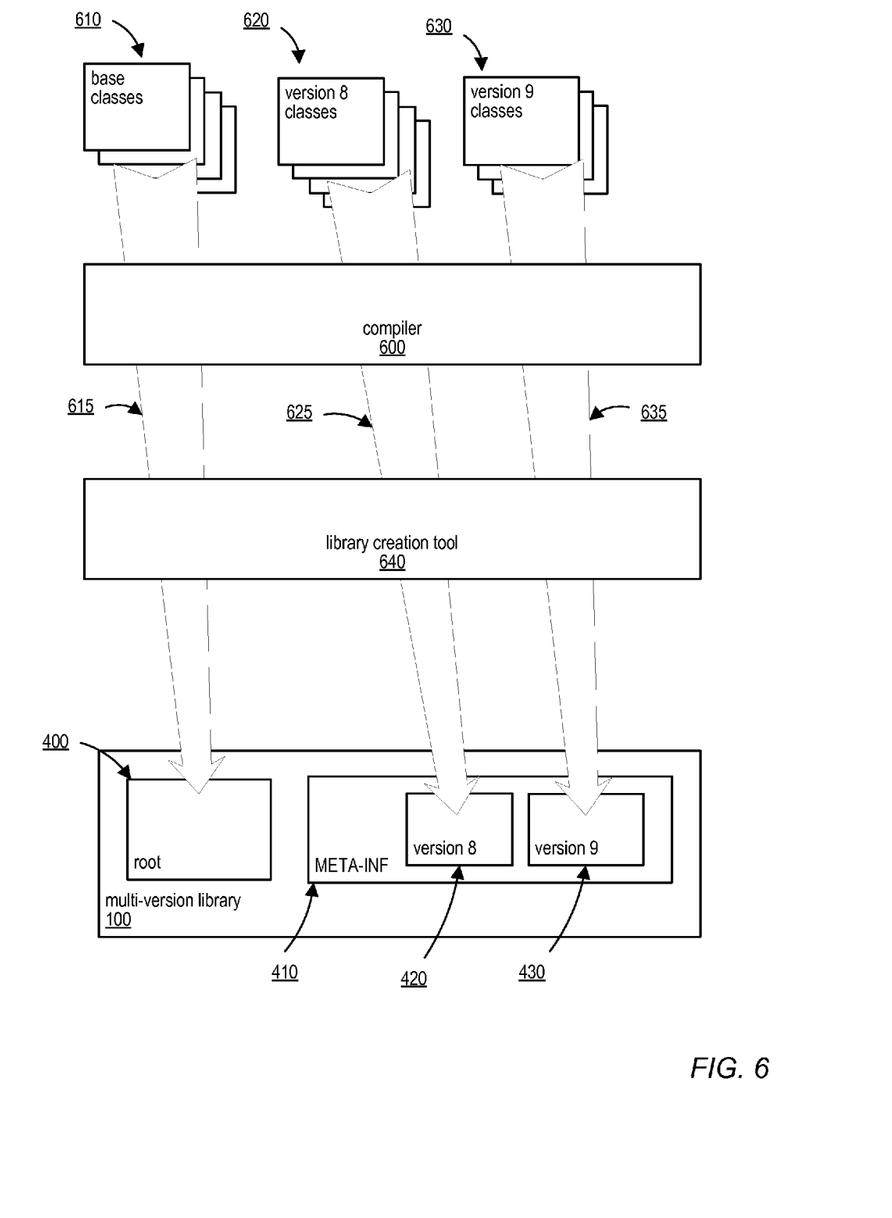
FIG. 6 is a logical block diagram illustrating a software development system configured to implement modular co-versioning, according to one embodiment.

For example, FIG. 6 is a logical block diagram illustrating a software development system configured to implement modular co-versioning, according to one embodiment. As shown in FIG. 6, a compiler 600 may be configured to work in conjunction with a library creation tool 640 to generate multi-version library 100, according to one embodiment. Compiler 600 may compile, either as part of a single build function or separately, source code 610, 620 and 630 in order to compile multiple versions of classes. For instance, source code 610 may include base versions of a set of classes while source codes 620 and 630 may include versions of the same classes configured to support respective versions of a software development kit or runtime environment platform, according to various embodiments.

As illustrated by arrows 615, 625 and 635, compiler 600 may supply compiled versions of the classes to a library creation tool 640, which in turn may be configured to generate multi-version library 100 such that multi-version library 100 may include multiple versions of the classes, according to modular co-versioning, described herein. Thus, the software development system illustrated in FIG. 6 may be configured to compile multiple versions of a class (e.g., in source code 610, 620 and/or 630) and include those multiple versions in a multi-version library 100, such that at runtime a different version of that class may be loaded by runtime environments/platforms corresponding to different versions of a software development kit.

While not illustrated in FIG. 6, additional software development tools and/or components may also be used and configured to implement (or aid in the implementation) of modular co-versioning, as described herein. Additionally, compiler 600 and/or library creation tool 640 may be configured to utilize different versions of a software development kit, libraries, build options, and/or other components for the different versions of the classes. For example, in one embodiment, source code 610 may be compiled using one version of a software development kit using one set of build options, while source code 620 may be compiled using a different version of the software development kit using a different set of build options, according to various embodiments.

Figure 7:
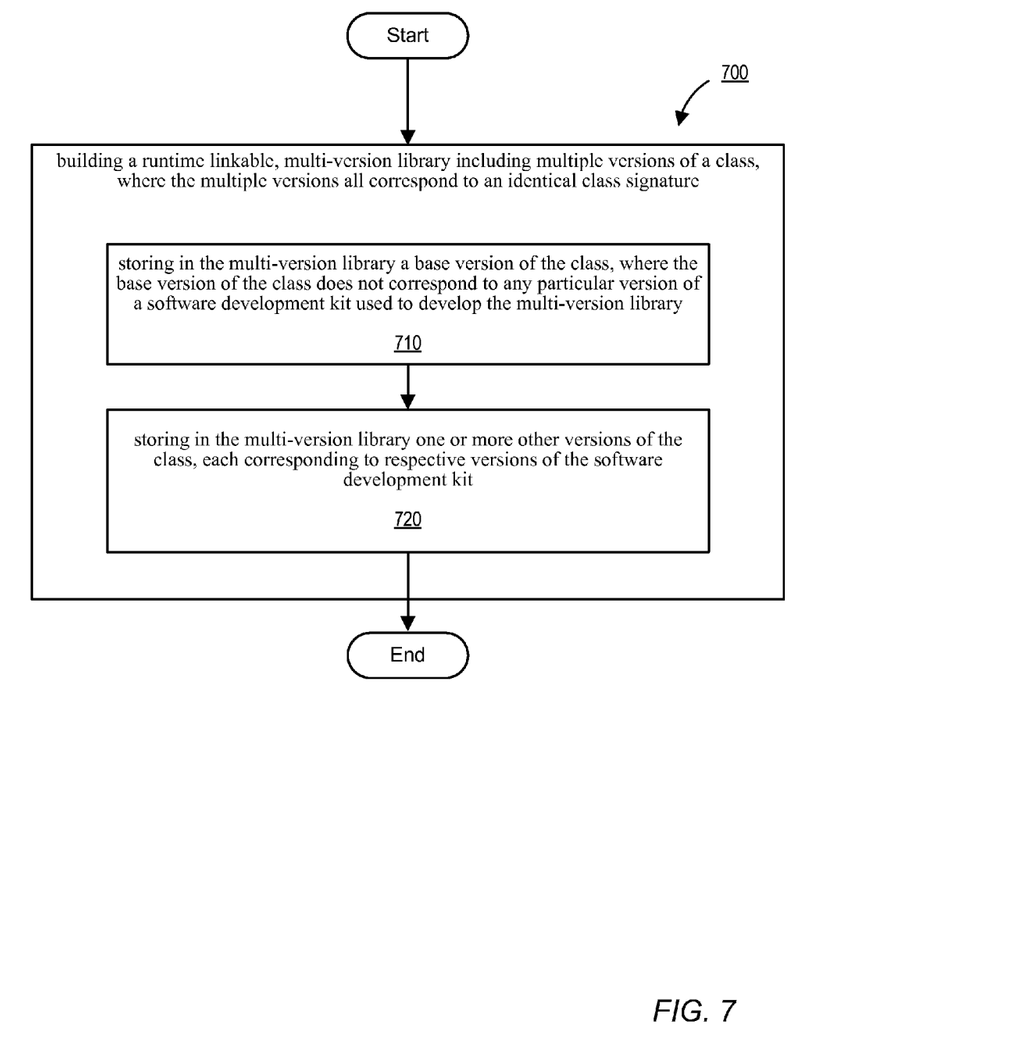
FIG. 7 is a flowchart illustrating one embodiment of a software development system generating a multi-version library, as described herein.

FIG. 7 is a flowchart illustrating one embodiment of a method for a creating a multi-version library according to modular co-versioning, as described herein. As shown in block 700 a software development system may be configured to build a runtime linkable, multi-version library that includes multiple versions of a class. In some embodiments, the multiple versions of the class may all correspond to an identical class signature, as described above. For example, in one embodiment, a software development system may be configured to create and/or generate a multi-version Java Archive using the Java programming language (and with other appropriate software development libraries and/or tools). In another embodiment, a software development system, such as that illustrated in FIG. 6, may be configured to create and/or generate a multi-version dynamically linked library using any of various programming languages, such as C, C++ and/or Java.

As part of building the multi-version library the software development system may be configured to store in the multi-version library a base version of the class that does not correspond to any particular version of a software development kit used to develop the multi-version library, as shown in block 710. As described above, the base version of a class may be supported (or may support) multiple versions of a software development kit, runtime environment or platform. In one Java-based example, a multi-version JAR may include a base version of a class (e.g., in the root content area) that supports versions 7, 8 and 9 of a Java Development Kit and therefore may not correspond to any particular version of the Java Development Kit. In other words, the base version of a class may be compiled using a specific version of a software development kit, but may not, in terms of modular co-versioning, correspond to any particular version of the software development kit (for determining which version of a class to load at runtime).

Additionally, in some embodiments, storing base version of a class may include storing the base version of the class in a root or base folder (section or other area) of the multi-version library, wherein the base folder is configured to store base versions of multiple classes and does not correspond to any particular version of the software development kit (or runtime environment or platform).

The method illustrated in FIG. 7 may also include storing, in the multi-version library, one or more other versions of the class, each corresponding to a respective version of the software development kit, as shown in block 720. For instance, as described above, a multi-version library 100 may include a base version of a class as well as multiple other versions of the same class (which may all correspond to an identical class signature). For example, multi-version library 100 may include a base version of a Java class that supports multiple versions of a Java Development Kit (JDK) as well as a version of the class that corresponds to version 8 of the JDK and another version of the class that supports version 9 of the JDK.

In some embodiments, storing one or more other versions of a class may include storing the other versions in respective, version-specific, folders (sections or other areas) of the multi-version library. As described above, the base version of a class may be stored in base or root folder (e.g., item 400 in FIG. 4), while each other version may be stored in version specific folders (e.g., items 420 and 430 of FIG. 4), according to some embodiments. Storing the other versions may also include storing metadata including information identifying the others versions and the particular software development kit versions to which they correspond (e.g., metadata 130 in FIGS. 1 and 2), as in one embodiment.

Additionally, library developers may modify their source layout in order to have separate source roots for the base version and for version-specific overrides, according to some embodiments. For example, a library developer may have to modify the software build process to compile the different version-specific roots with different language levels, and also to create a multi-version library (e.g., using updated development tools). Additionally, developers may test on multiple platforms (e.g., multiple versions of runtime environments), such as to that the different versions of code that may be running on different platforms.

Additionally, in some embodiments, rather than loading a version of a class based on a version of a currently executing runtime environment, a currently executing software platform and/or a software development kit, a particular version of a class may be loaded based on a user (e.g., developer) preference. For example, a library developer may generate and distribute a multi-version library, such as multi-version library 100, and a user (e.g., developer or programmer) of multi-version library 100 may indicate a preference for the runtime environment to ignore one or more versions of a class, according to some embodiments.

For instance, in one embodiment a user may indicate a preference for never using the latest version of classes, even when executing on a runtime environment corresponding to that latest versions. For example, even though the classes in a multi-version library may support the latest version of the runtime environment, perhaps the code of the end user of the multi-version library (e.g., a programmer using that library) may not.

Alternatively, a user may indicate a preference for the runtime environment to only use particular versions of classes. For instance, in one embodiment, a user may indicate a preference to use only the base versions of one or more classes in a multi-version library.

User preference regarding which versions of classes in a multi-version library may be indicated in any of various manners, according to various embodiments. For example, in one embodiment, a user may programmatically indicate, such as by calling one or more methods of an API, preferences regarding using or ignoring one or more versions of classes in a multi-version library. In another embodiment, a user may indicate preferences regarding using or ignoring one or more versions of classes in a multi-version library using one or more global, system and/or environmental variables.

In some embodiments, a user may indicate preference regarding using or ignoring versions of classes in a multi-version library on a class-by-class basis, while in other embodiments, such preferences may only be allows on a version by version basis. For example, referring back to FIG. 4, in one embodiment, a user may be able to indicate a preference for ignoring (e.g., never using) classes corresponding to version 9 (e.g., classes stored in folder 430), while in another embodiment, the user may be able to indicate a preference for not using the version 8 version of class B (e.g., represented by block 450 B) while still using other version 8 versions of classes (such as class A represented by block 440B). Indicating versions on a class by class basis may involve additional risk regarding the compatibility of executing mixed versions of classes (e.g., one version of one class and another version of a different class) that may not execute properly together, according to some embodiments.

Figure 8:
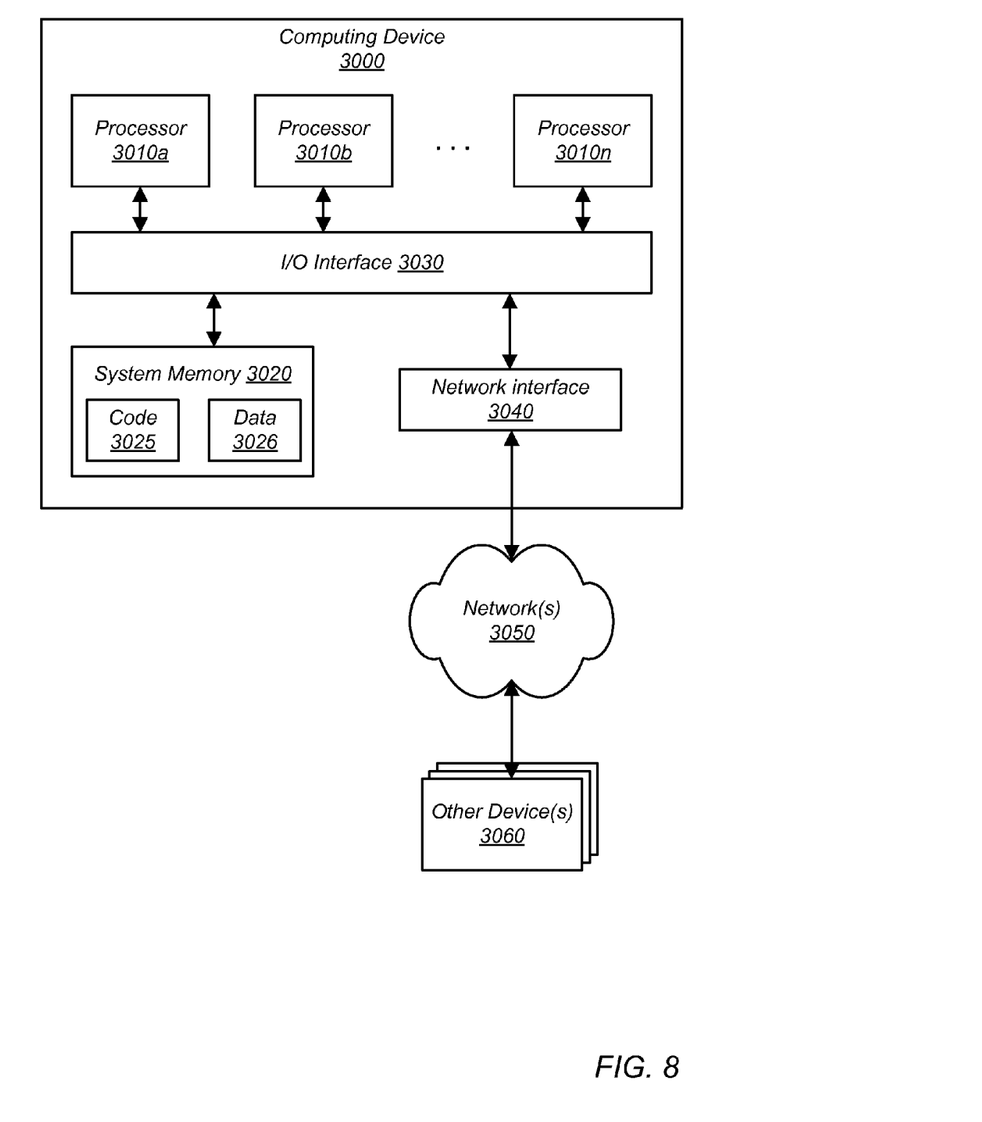
FIG. 8 is a logical block diagram illustrating an example computer system suitable for implement modular co-versioning, according to one embodiment.

In at least some embodiments, a computer system that implements a portion or all of one or more of the technologies described herein may include a general-purpose computer system that includes or is configured to access one or more computer-readable media. FIG. 8 illustrates such a general-purpose computing device 3000 suitable for implementing the method, features and enhancements described herein. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026. For example, memory 3020 and well as code 3025 and data 3026 may store, in one embodiment, program instructions and data for implementing modular co-versioning, including for example, multi-version library 100, runtime environment 200, class loader 210, compiler 600 and/or library creation tool 640, described above.

In various embodiments, one or more components configured to implement modular co-versioning, such as runtime environment 200, compiler 600 and/or library creation tool 640 (and/or any individual sub-modules thereof) may each be implemented in any of various programming languages or methods. For example, in one embodiment, runtime environment 200, compiler 600 and/or library creation tool 640 may be written in any of the JAVA, C, C++, assembly or other general purpose programing languages, while in another embodiment, one or more of them may be written using a different, more specialized, programming language. Moreover, in some embodiments, runtime environment 200, class loader 210, compiler 600 and/or library creation tool 640 (and/or various sub-modules thereof) may not be implemented using the same programming language.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example.

In some embodiments, system memory 3020 may be one embodiment of a computer-readable (e.g., computer-accessible) medium configured to store program instructions and data as described above with respect to FIGS. 1-7 for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory.

Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 8 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. In various of the methods, the order of the steps may be changed, and various elements may be added, reordered, combined, omitted, modified, etc. Various of the steps may be performed automatically (e.g., without being directly prompted by user input) and/or programmatically (e.g., according to program instructions).

While various systems and methods have been described herein with reference to, and in the context of, specific embodiments, it will be understood that these embodiments are illustrative and that the scope of the disclosure is not limited to these specific embodiments. Many variations, modifications, additions, and improvements are possible. For example, the blocks and logic units identified in the description are for understanding the described embodiments and not meant to limit the disclosure. For example, actions, processes, methods, tasks or functions described herein as being performed by a particular component, such as runtime environment 200, class loader 210, compiler 600 and/or library creation tool 640 may, in some embodiments, be performed by a different component and vice versa. Additionally, functionality may be separated or combined in blocks differently in various realizations of the systems and methods described herein or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of examples that follow. Finally, structures and functionality presented as discrete components in the exemplary configurations may be implemented as a combined structure or component.

Although the embodiments above have been described in detail, numerous variations and modifications will become apparent once the above disclosure is fully appreciated. It is intended that the following claims be interpreted to embrace all such variations and modifications.

What is claimed is:

1. A non-transitory, computer-readable storage medium storing program instructions that when executed on a computing device cause the computing device to perform:
   loading, at runtime by a runtime module executing within a runtime environment, a class from a runtime linkable, multi-version library, wherein the multi-version library is configured to include multiple versions of classes, wherein all versions of a respective class correspond to an identical class signature for the respective class;
   wherein said loading comprises:
      determining whether the multi-version library includes a version of the class associated with a current version of a software development kit for implementing software executable within a respective current version of the runtime environment; and
      in response to determining that the multi-version library does include the version of the class associated with the current version of the software development kit, loading, from the multi-version library, the version of the class associated with the current version of the software development kit.

2. The non-transitory, computer-readable storage medium of claim 1, wherein to load the version of the class associated with the current version of the software development kit, the program instructions further cause the computing device to perform:
   loading the version of the class from a folder in the multi-version library associated with the current version of the software development kit, wherein the folder is configured to store versions of multiple classes, each associated with the current version of the software development kit.

3. The non-transitory, computer-readable storage medium of claim 1, wherein the program instructions further cause the computing device to perform:
   in response to determining that the multi-version library does not include the version of the class associated with the current version of the software development kit:
      determining whether the multi-version library comprises a version of the class associated with a specific previous version of the software development kit, wherein the specific previous version of the software development kit occurs prior than the current version of the software development kit in a defined order of software development kit versions; and
      in response to determining that the multi-version library does include the version of the class associated with the specific previous version of the software development kit, loading, from the multi-version library, the version of the class associated with the specific previous version of the software development kit.

4. The non-transitory, computer-readable storage medium of claim 3, wherein the program instructions further cause the computing device to perform:
   in response to determining that the multi-version library does not include the version of the class associated with the specific previous version of the software development kit, loading a base version of the class from the multi-version library, wherein the base version of the class is not associated with any particular version of the software development kit.

5. The non-transitory, computer-readable storage medium of claim 3, wherein to load, from the multi-version library, the version of the class associated with the specific previous version of the software development kit, the program instructions further cause the computing device to perform:
   loading the version of the class associated with the specific previous version of the software development kit from a folder in the multi-version library associated with the specific previous version of the software development kit, wherein the folder is configured to store versions of multiple classes, each associated with the specific previous version of the software development kit.

6. The non-transitory, computer-readable storage medium of claim 1, wherein said determining whether the multi-version library includes a version of the class associated with a current version of a software development kit is performed without regard to the presence, within the multi-version library of a version of the class associated with a later version of the software development, wherein the later version of the software development kit occurs after the current version of the software development in a defined order of software development kit versions.

7. The non-transitory, computer-readable storage medium of claim 1, wherein the multi-version library is a multi-version archive implemented using a platform-independent, object oriented programming language.

8. A computing device, comprising:
   a processor; and
   a memory coupled to the processor, wherein the memory comprises program instructions that when executed by the processor, cause the processor to perform:
   executing a class loader within a runtime environment;
   loading, at runtime by the class loader, a class from a runtime linkable, multi-version library, wherein the multi-version library is configured to include multiple versions of classes, wherein all versions of a respective class correspond to an identical class signature for the respective class;
   wherein said loading comprises:
      determining whether the multi-version library includes a version of the class associated with a current version of a software development kit for implementing software executable within a respective current version of the runtime environment within which the class loader is executing; and
      in response to determining that the multi-version library does include the version of the class associated with the current version of the software development kit, loading, from the multi-version library, the version of the class associated with the current version of the software development kit.

9. The computing device of claim 8, wherein to load the version of the class associated with the current version of the software development kit, the program instructions further cause the processor to perform:
   loading the version of the class from a folder in the multi-version library associated with the current version of the software development kit, wherein the folder is configured to store versions of multiple classes, each associated with the current version of the software development kit.

10. The computing device of claim 8, wherein the program instructions further cause the processor to perform:
    in response to determining that the multi-version library does not include the version of the class associated with the current version of the software development kit:
       determining whether the multi-version library comprises a version of the class associated with a specific previous version of the software development kit, wherein the specific previous version of the software development kit occurs prior than the current version of the software development kit in an order to software development kit versions; and in response to determining that the multi-version library does include the version of the class associated with the specific previous version of the software development kit, loading, from the multi-version library, the version of the class associated with the specific previous version of the software development kit.

11. The computing device of claim 10, wherein the program instructions further cause the processor to perform:

in response to determining that the multi-version library does not include the version of the class associated with the specific previous version of the software development kit, loading a base version of the class from the multi-version library, wherein the base version of the class is not associated with any particular version of the software development kit.

12. The computing device of claim 10, wherein to load, from the multi-version library, the version of the class associated with the specific previous version of the software development kit, the program instructions further cause the processor to perform:

loading the version of the class associated with the specific previous version of the software development kit from a folder in the multi-version library associated with the specific previous version of the software development kit, wherein the folder is configured to store versions of multiple classes, each associated with the specific previous version of the software development kit.

13. The computing device of claim 8, wherein the respective current version of the runtime environment is associated with an earlier version of the software development kit as compared to a latest version of the software development kit in a defined order of software development kit versions;

wherein the multi-version library includes one or more versions of classes associated with the latest version of the software development kit; and wherein said determining whether the multi-version library includes a version of the class associated with a current version of a software development kit comprises determining whether the multi-version library includes a version of the class associated with the earlier version of the software development kit and not determining whether the multi-version library includes a version of the class associated with the latest version of the software development kit.

14. The computing device of claim 8, wherein the multi-version library is a multi-version archive implemented using a platform-independent, object oriented programming language, and wherein said loading a class from the runtime linkable, multi-version library comprises a class loader executing on the computing device loading the class from the multi-version Java Archive.

15. A computer implemented method, comprising:

building, by a computing device comprising a hardware processor, a runtime linkable, multi-version library comprising multiple versions of a class, wherein the multiple versions all correspond to an identical class signature; wherein said building comprises:

storing in the multi-version library a base version of the multiple versions of the class, wherein the base version of the class does not correspond to any particular version of a software development kit; and storing in the multi-version library one or more other versions of the multiple versions of the class, wherein each of the one or more other versions correspond to respective versions of the software development kit.

16. The computer implemented method of claim 15, wherein said storing the one or more other versions of the class comprises storing metadata in the multi-version library indicating that each of the other versions corresponds to a respective version of the software development kit.

17. The computer implemented method of claim 15, wherein said storing the base version of the class comprises storing the base version of the class in a base folder of the multi-version library, wherein the folder is configured to store a respective base version of each of one or more classes, wherein the base folder does not correspond to any particular version of the software development kit.

18. The computer implemented method of claim 15, wherein said storing the one or more other versions of the class comprises storing each of the one or more other versions in respective folders of the multi-version library, wherein each respective folder is associated with a respective version of the software development kit.

19. The computer implemented method of claim 15, wherein the multi-version library is a multi-version archive implemented using a platform-independent, object oriented programming language.

20. The computer implemented method of claim 15, wherein the multi-version library is a dynamically linked library implemented using one or more of:

the C programming language;
the C++ programming language; or
the Java programming language.

* * * * *

UNITED STATES PATENT AND TRADEMARK OFFICE
CERTIFICATE OF CORRECTION

PATENT NO. : 9,519,468 B2
APPLICATION NO. : 14/622639
DATED : December 13, 2016
INVENTOR(S) : Goetz et al.

It is certified that error appears in the above-identified patent and that said Letters Patent is hereby corrected as shown below:

In the Specification

In Column 8, Lines 8-19, delete "Java-based example above, at runtime, folder 430 may be ignored by a runtime environment (e.g., a class loader executing within the runtime environment) corresponding to JDK version 8. Thus, a version 8 based class loader may search for classes in folder 420 (e.g., corresponding to the currently executing version). If no appropriate class is found, the class loader may then search the for same class in folders corresponding to previous (e.g., lower) versions of the JDK if any exist in the multi-version JAR, and may then search the JAR content root folder if no appropriate version of the class is found in any of the version-specific areas, according to some embodiments." and insert the same on Column 8, Line 7 as a continuation of the same paragraph.

In Column 8, Line 63, delete "and or" and insert -- and/or --, therefor.

Signed and Sealed this
Twentieth Day of June, 2017

Joseph Matal
*Performing the Functions and Duties of the
Under Secretary of Commerce for Intellectual Property and
Director of the United States Patent and Trademark Office*